(12) United States Patent
Jang et al.

(10) Patent No.: US 9,922,336 B2
(45) Date of Patent: Mar. 20, 2018

(54) METHOD AND SYSTEM FOR MANAGING ITINERARY

(71) Applicant: Samsung Electronics Co., Ltd., Suwon-si, Gyeonggi-do (KR)

(72) Inventors: Yungeun Jang, Goyang-si (KR); Hyunsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/455,353

(22) Filed: Aug. 8, 2014

(65) Prior Publication Data
US 2015/0046088 A1 Feb. 12, 2015

(30) Foreign Application Priority Data
Aug. 12, 2013 (KR) .................. 10-2013-0095154

(51) Int. Cl.
*G01C 21/34* (2006.01)
*G06Q 30/02* (2012.01)
*G06Q 10/04* (2012.01)
*G06Q 50/14* (2012.01)

(52) U.S. Cl.
CPC ....... *G06Q 30/0207* (2013.01); *G01C 21/343* (2013.01); *G06Q 10/047* (2013.01); *G06Q 50/14* (2013.01)

(58) Field of Classification Search
CPC .. G01C 21/34; G01C 21/343; G06Q 30/0207; G06Q 10/047
USPC ................. 701/537, 538, 540, 533
See application file for complete search history.

(56) References Cited

U.S. PATENT DOCUMENTS

| | | | |
|---|---|---|---|
| 2004/0059498 A1* | 3/2004 | Chinomi | G01C 21/3682 701/516 |
| 2012/0010996 A1* | 1/2012 | Horvitz et al. | 705/14.53 |
| 2013/0253831 A1* | 9/2013 | Langendorff | 701/533 |
| 2013/0253833 A1* | 9/2013 | Tuukkanen | 701/538 |
| 2014/0171129 A1* | 6/2014 | Benzatti | H04W 4/025 455/457 |
| 2014/0214462 A1* | 7/2014 | Farina et al. | 705/6 |
| 2014/0279196 A1* | 9/2014 | Wilson et al. | 705/26.7 |

FOREIGN PATENT DOCUMENTS

KR 10-2013-0020279 A 2/2013

* cited by examiner

*Primary Examiner* — Yazan Soofi
(74) *Attorney, Agent, or Firm* — Jefferson IP Law, LLP

(57) ABSTRACT

A method and a system for easily managing an itinerary are provided. The method includes generating, by an electronic device, a trip route, selecting a trip item for recommendation information searching, searching for recommendation information of the selected trip item based on the generated trip route, displaying the searched recommendation information at a corresponding location on the generated trip route, modifying the generated trip route based on selected recommendation information from the displayed recommendation information, and storing the modified trip route.

20 Claims, 12 Drawing Sheets

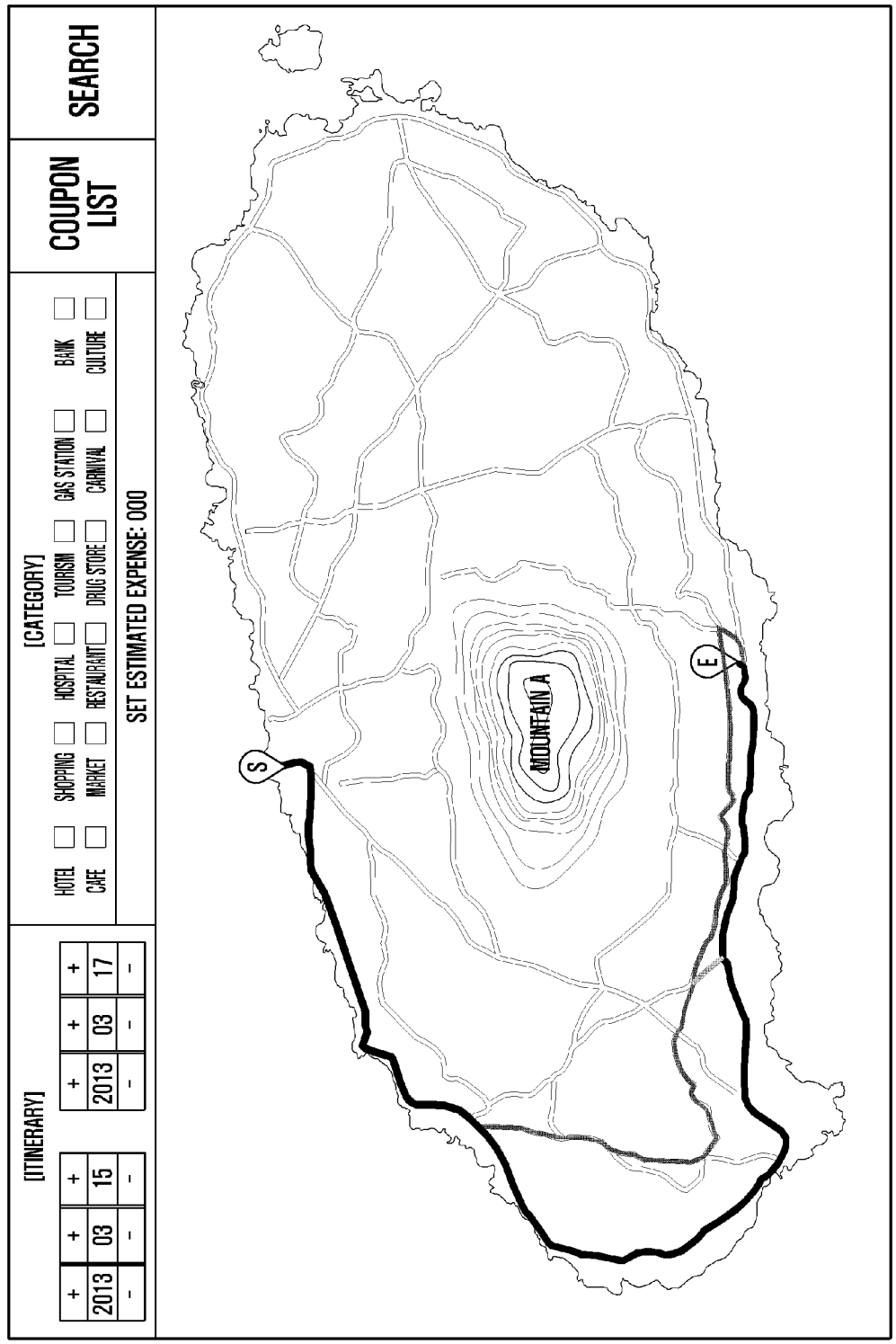

FIG. 4C

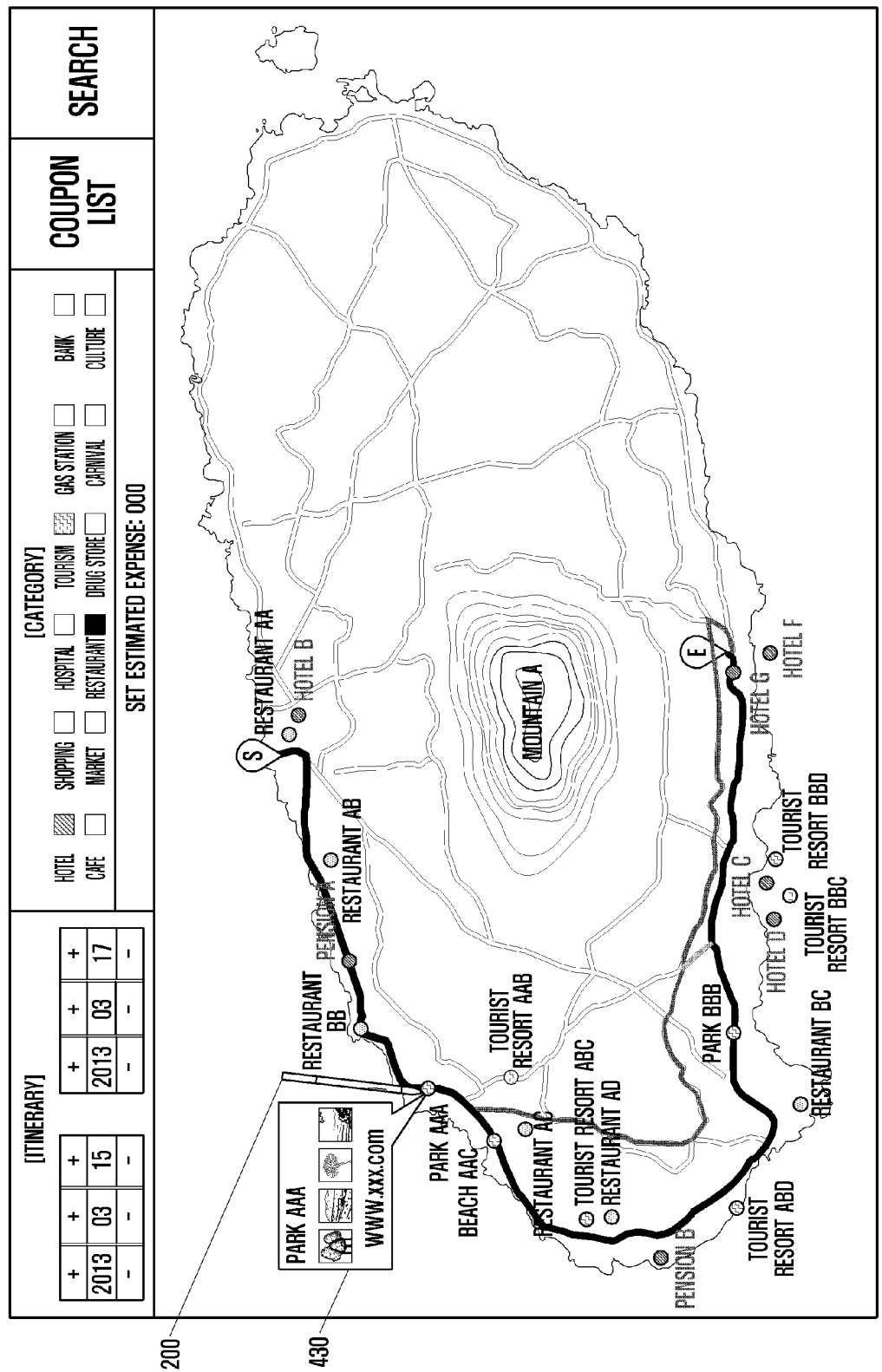

METHOD AND SYSTEM FOR MANAGING ITINERARY

CROSS-REFERENCE TO RELATED APPLICATION(S)

This application claims the benefit under 35 U.S.C. § 119(a) of a Korean patent application filed on Aug. 12, 2013 in the Korean Intellectual Property Office and assigned Serial number 10-2013-0095154, the entire disclosure of which is hereby incorporated by reference.

TECHNICAL FIELD

The present disclosure relates to a method and a system for managing an itinerary. More particularly, the present disclosure relates to a method and a system for easily managing an itinerary.

BACKGROUND

Recently, the use of electronic apparatus is rapidly increasing according to dramatic developments in semiconductor, information and communication technologies which provide various functions desired by users. For example, the electronic apparatus provides various functions such as a communication function, image or video recording function, broadcast receiving function, internet connection function, and map service function. Accordingly, the electronic apparatus became a necessity for modern people.

In the meantime, interests in travel are increasing due to a change in a leisure life such as a 5-day work week. For example, the people can more easily share information related to the travel and buy travel goods through internet. Further, the people can plan their own travel schedules rather than relying on a package travel provided by a travel agency.

However, different from the package travel provided by the travel agency, it may take a longer time to prepare a travel because a travel planner has to prepare a trip route by himself or herself. For example, it could take a week or more than 6 months to decide the trip route. When collecting travel information through the internet, the travel planner has to repeatedly visit many web sites because the travel information is distributed in a plurality of internet web sites, such as web sites of a travel agency, travel community, blog related to travel information, and travel reservation. Further, the travel planner may encounter difficulties in planning a trip route, because the travel planner collects travel information provided only with texts or photos but without practical map information through the plurality of internet web sites. Therefore, there may be problems in managing a total travel schedule by matching a map including a trip route with information of texts or photos related to the corresponding trip route.

Further, the travelers generally possess travel information collected from the internet or travel guidebook in printed matters. Accordingly, the travelers can encounter difficulties in finding out a correct route on the spot or must search required travel information during travelling. Further, some travelers want to keep a travel record, but may have inconveniences in organizing the travel record after the travel.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages to provide at least advantages described below. Accordingly, an aspect of the present disclosure is to provide a method and a system for easily managing an itinerary so that a user can conveniently set up and manage the itinerary.

In accordance with an aspect of the present disclosure, a method for managing an itinerary on an electronic device is provided. The method includes generating, by the electronic device, a trip route, selecting a trip item for recommendation information searching, searching for recommendation information of the selected trip item based on the generated trip route, displaying the searched recommendation information at a corresponding location on the generated trip route, modifying the generated trip route based on selected recommendation information from the displayed recommendation information, and storing the modified trip route.

In accordance with another aspect of the present disclosure, an electronic apparatus for managing an itinerary is provided. The electronic apparatus includes an input unit configured to receive a signal of selecting a trip item for recommendation information searching, a control unit configured to generate a trip route, to search for recommendation information of the selected trip item based on the generated trip route, to display the searched recommendation information at a corresponding location on the generated trip route, and to modify the generated trip route based on the selected recommendation information from the displayed recommendation information, and a storage unit configured to store the modified trip route.

In accordance with another aspect of the present disclosure, a system for managing an itinerary is provided. The system includes an electronic apparatus configured to generate a trip route, to display recommendation information related to the generated trip route and a trip item when the trip item is selected, and to modify the generated trip route based on selected recommendation information from the displayed recommendation information, and an information providing server configured to receive the trip route and the trip item from the electronic apparatus, to search for a recommendation information related to the trip item based on the trip route transmitted from the electronic apparatus and to transmit the searched recommendation information to the electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, 4C, 4D, 4E, and 4F are screen examples illustrating methods for setting a trip route in an electronic apparatus according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

The electronic apparatus may be a mobile communication terminal, a smart phone, a tablet Personnel Computer (PC), a hand-held PC, a Portable Multimedia Player (PMP), a Personal Digital Assistant (PDA), or a notebook PC.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
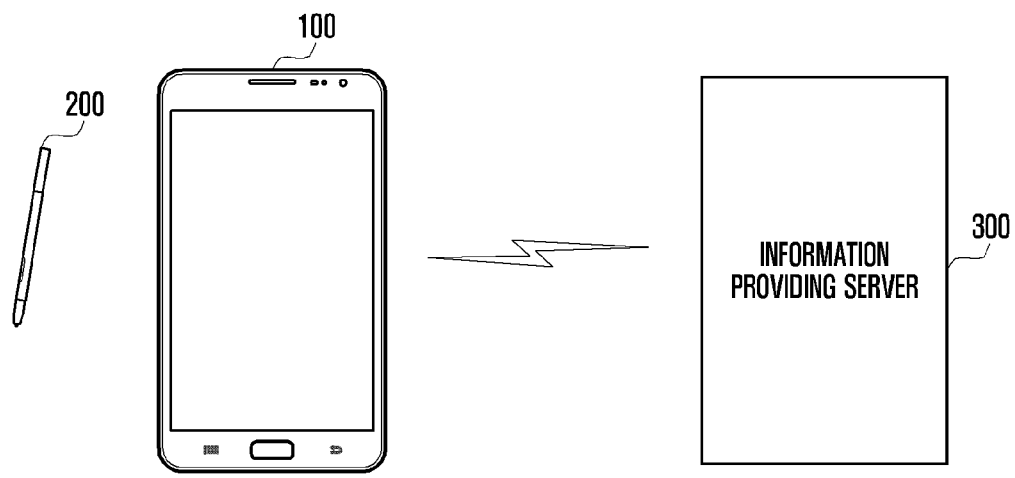
FIG. 1 is a block diagram illustrating a brief system for managing an itinerary according to an embodiment of the present disclosure.

FIG. 1 is a block diagram illustrating a brief system for managing an itinerary according to an embodiment of the present disclosure.

Referring to FIG. 1, a system for managing an itinerary according to an embodiment of the present disclosure is illustrated, where the system may include an electronic apparatus 100 and an information providing server 300.

If a request for setting a trip route is detected, then the electronic apparatus 100 displays a map in a predetermined size (scale). Here, the electronic apparatus 100 displays the map based on the current location or displays a most recently displayed map. Data for displaying the map may be stored in the electronic apparatus 100. Alternatively, the electronic apparatus 100 may display the map not by storing the map data but receiving the map data from a map providing server (not shown) when a map display is requested.

In a state of displaying the map corresponding to a travelling area, a user can input a brief trip route. For example, the user may input the brief trip route by moving a finger, stylus pen, or electronic pen on the map. If the input of brief trip route is detected, then the electronic apparatus 100 can correct the trip route based on road information and means of transportation. Here, the trip route may be more than one. Alternatively, the trip route can be recommended if the user inputs a departure point, destination, and passage.

In the meantime, the electronic apparatus 100 can display recommendation information for trip items based on a vicinity of a modified trip route (for example, within 3 Km distance), if the trip item (for example, a price, time, coupon, lodging, restaurant, cafe, drug store, carnival, bank, gas station, hospital, shopping, market, and tourist resort) is selected. For this, the electronic apparatus 100 transmits information of modified trip route and the selected trip item to the information providing server 300, and receives recommendation information from the information providing server 300.

If specific recommendation information is selected from recommendation information displayed on the trip route, then the electronic apparatus 100 can display details of the selected recommendation information. Alternatively, if an approach of electronic pen 200 (for example, hovering) is detected at the display location of the specific recommendation information, then the electronic apparatus 100 can display details of the specific recommendation information. For example, if Park AAA is selected or an approach of the electronic pen 200 is detected at the display location of Park AAA, then the electronic apparatus 100 can display detailed information (location, photos, prices, and facilities) of Park AAA.

The electronic apparatus 100 can decide a final trip route based on the recommendation information selected by a user from the recommendation information displayed on a map.

If a generation of contents such as a video, a photo, and a memo is detected after setting the final trip route, then the electronic apparatus 100 identifies whether the location of generated contents is included in the trip route, and links the generated contents to a corresponding location of the trip route if the location of generated contents is included in the trip route.

The electronic apparatus 100 can output a map screen displaying the final trip route (trip route view screen) while performing a trip route view function. If a specific location is selected from the trip route view screen or an approach of electronic pen is detected, then the electronic apparatus 100 identifies whether contents linked to the corresponding location exist, and displays the linked contents if they exist. For example, the electronic apparatus 100 can display a thumbnail image of a photo or a video in the screen.

The electronic apparatus 100 can re-recommend a trip route in real time according to traffic information and weather information. For example, if a traffic jam is caused by an accident or a tourist spot becomes unsuitable for sightseeing due to a sudden change of weather, then the electronic device 100 informs it to the user and provides a new recommendation place or route in real time.

Further, the electronic apparatus 100 periodically identifies whether information (for example, a coupon) of a place included in the trip route has been updated, and informs the user if update information exists. If the user registered an alarm at specific spot of the trip route, then the electronic apparatus 100 can inform the user when the specific spot is reached.

The information providing server 300 can provide travel information for the electronic apparatus 100. For this, the information providing server 300 receives a trip route and selected trip items from the electronic apparatus 100 to search and provide recommendation information for the trip items based on the trip route. For example, the information providing server 300 can search and provide a lodging facility, restaurant, and tourist resort located on the trip route. The information providing server 300 can provide the recommendation information by linking to a regional tourist service station and web site or blog for providing travel information. Here, the information providing server 300 can also provide discount information (for example, a coupon). Further, the information providing server 300 can provide recommendation information by considering weather and traffic conditions. For example, the information providing server 300 may exclude a beach from tourist spots if a Typhoon has been announced.

Figure 2:
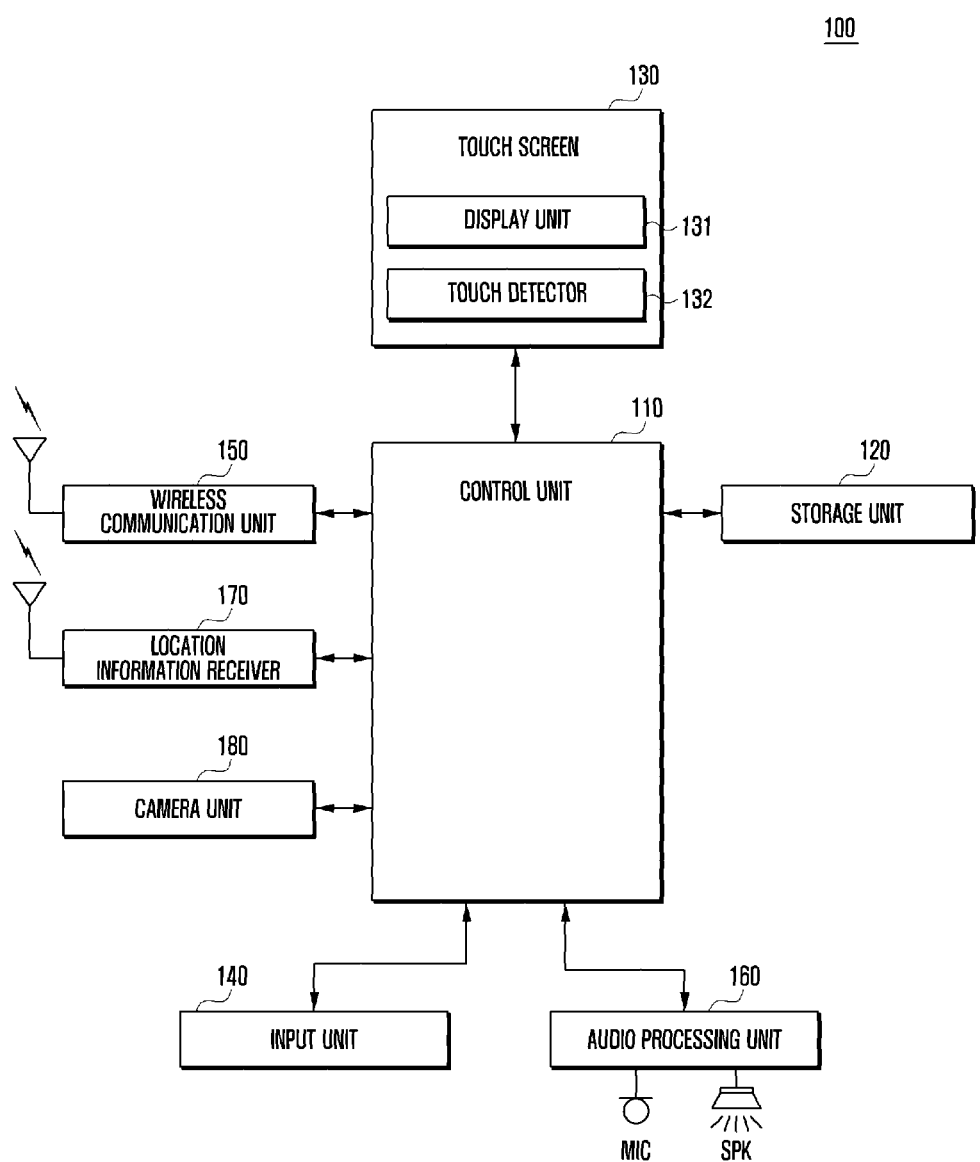
FIG. 2 is a block diagram illustrating a configuration of an electronic apparatus according to an embodiment of the present disclosure.

FIG. 2 is a block diagram illustrating a configuration of an electronic apparatus according to an embodiment of the present disclosure.

Referring to FIG. 2, an electronic apparatus 100 according to an embodiment of the present disclosure is illustrated, where the electronic apparatus 100 may be configured with a control unit 110, a storage unit 120, a touch screen 130, an input unit 140, a wireless communication unit 150, an audio processing unit 160, a location information receiver 170, and a camera unit 180. The touch screen 130 may include a display unit 131 and a touch detector 132.

The audio processing unit 160 is connected to a speaker SPK for outputting audio signals received during telephone communication, audio signals included in a received message, and audio signals stored in the storage unit 120, and is connected to a Microphone (MIC) for collecting user's voices and other audio signals. The audio processing unit 160 can output various sound effects for an itinerary through the Speaker (SPK) according to an embodiment of the present disclosure.

The input unit 140 may include a plurality of input keys and function keys for inputting numeral or character information and setting various functions. The function keys may include direction, side, and shortcut keys for performing specific functions. Further, the input unit 140 generates key signals related to a user setting and a function control of the electronic apparatus 100, and transmits them to the control unit 110. The input unit 140 may be configured with one of input means or combinations thereof, such as a QWERTY keypad, a 3*4 keypad, a 4*3 keypad, a ball joystick, an optical joystick, a wheel key, a touch key, a touch pad, and a touchscreen. If the electronic apparatus 100 supports a full touch screen, then the input unit 140 may include some of functions keys such as a volume key, a power key, a menu key, a cancel key, and a home key.

The input unit 140 according to an embodiment of the present disclosure can generate various input signals for controlling a procedure of managing an itinerary, such as a request signal for trip route setting, a signal for selecting a trip item, a signal for selecting a recommendation place displayed on a map, and a request signal for outputting detailed information of the recommendation place, which can be transmitted to the control unit 110.

The camera unit 180 is a device for photographing a subject, and storing a photographed subject by converting to an electrical signal. The camera unit 180 may be configured with a Charge Coupled Device (CCD) image sensor or a Complementary Metal Oxide Semiconductor (CMOS) image sensor. The camera unit 180 can support to record a still image or a moving image. The still image or moving image taken by the camera unit 180 can be linked to a trip route.

The location information receiver 170 identifies the current location of the electronic apparatus 100 by using various methods. For example, the location information receiver 170 can identify the current location of the electronic apparatus 100 by using a Global Positioning System (GPS), a Global Navigation Satellite System (GNSS), or a Galileo system. Alternatively, the location information receiver 170 can identify the current location of the electronic apparatus 100 by using a triangulation method which calculates the current location from wireless signals received from a plurality of base stations (at least 3 base stations). Further, the location information receiver 170 can identify the current location of the electronic apparatus 100 by using an Access Point (AP) located nearby which knows the current location. Such a method for identifying the current location of the electronic apparatus 100 is well-known to those skilled in the art, and thereby a detailed description will be omitted here. The location information receiver 170 is activated when photographing a still image or a moving image, and provides the location of photographing for the control unit 110. Here, the control unit 110 can link the photographed still image or moving image to a trip route by comparing the location of photographing with the trip route.

The wireless communication unit 150 supports a wireless communication function of the electronic apparatus 100. The wireless communication unit 150 may include a mobile communication module for supporting a 3G or 4G mobile communication function and a Wireless Local Area Network (WLAN) module for supporting a Wi-Fi communication function. The wireless communication unit 150 according to an embodiment of the present disclosure can form a communication channel with the information providing server 300. For example, the wireless communication unit 150 transmits information of trip route and selected trip item to the information providing server 300, and receives recommendation information from the information providing server 300.

The touch screen 130 performs an input function and a display function. For this, the touch screen 130 may include a display unit 131 and a touch detector 132. The display unit 131 displays various menus of the electronic apparatus 100, user input information, or information to be provided for a user. The display unit 131 may be configured with a Liquid Crystal Display (LCD), an Organic Light Emitted Diode (OLED), or an Active Matrix Organic Light Emitted Diode (AMOLED). The display unit 131 can provide various screens for utilizing the electronic apparatus 100 such as a home screen, menu screen, web page screen, and communication screen. The display unit 131 according to an embodiment of the present disclosure can display various screens for managing an itinerary such as a trip route setting screen, a trip item selection screen, a trip route view screen, a detailed information display screen, and a coupon information display screen. Such screens will be described in more detail referring to the accompanying screen examples.

The touch detector 132 is a device for supporting an input function which generates a touch event when a touch input means such as a user's finger, stylus pen, and electronic pen contacts or approaches, and transmits the generated touch event to the control unit 110. In more detail, the touch detector 132 can identify the generation of touch event by a change of physical properties (for example, capacitance and resistance) according to the touch or approach of the touch input means. The touch detector 132 according to an embodiment of the present disclosure generates various touch signals for managing an itinerary and transmits them to the control unit 110. For example, the touch detector 132 can detect a touch signal for drawing a brief trip route on a map, signal for selecting a trip item, request signal for recommendation information corresponding to the selected trip item, and signal for selecting a recommendation place displayed on the trip route.

The storage unit 120 stores an Operating System (OS) of the electronic apparatus 100 and application programs for optional functions such as a sound play function, image or video play function, broadcast play function, internet connection function, character message function, and map service function. Further, the storage unit 120 can save various data such as video data, game data, music data, movie data, and map data. The storage unit 120 according to an embodiment of the present disclosure stores an itinerary application for managing an itinerary. The storage unit 120 can store a trip route set by a user. Further, the storage unit 120 can store contents such as a still image, a moving image, a memo, and a diary. The contents may be one generated during a travel. The contents generated in the travel may include link information to the trip route. For example, if the user selects (or an approach of electronic pen) a specific location in a trip route view screen, a thumbnail image linked to the specific location can be output in the trip route view screen.

The control unit 110 controls a general operation of the electronic apparatus 100 and signal flows between internal blocks of the electronic apparatus 100, and performs a data processing function. For example, the control unit 110 may be configured with a Central Processing Unit (CPU) and an Application Processor. The control unit 110 may be configured with a single core processor or a multi-core processor. The control unit 110 can control a procedure of managing an itinerary such as setting a trip route, displaying the set trip route, modifying the trip route, preparing a trip diary. Detailed descriptions on the control unit 110 will be made later.

Even though not shown in FIG. 2, the electronic apparatus 100 may further include components having additional functions such as a broadcast receiving module, a sensor module including a plurality of sensors (for example, a motion sensor, an illumination sensor, an acceleration sensor, and a geomagnetic sensor), a digital sound play module like an MP3, and a voice recognition module. Variations of the components are being developed very fast according to the trend of digital convergence, and thereby all of them cannot be listed here. However, the electronic apparatus 100 according to the present disclosure may include any component having the same level as the aforementioned components.

Figure 3:
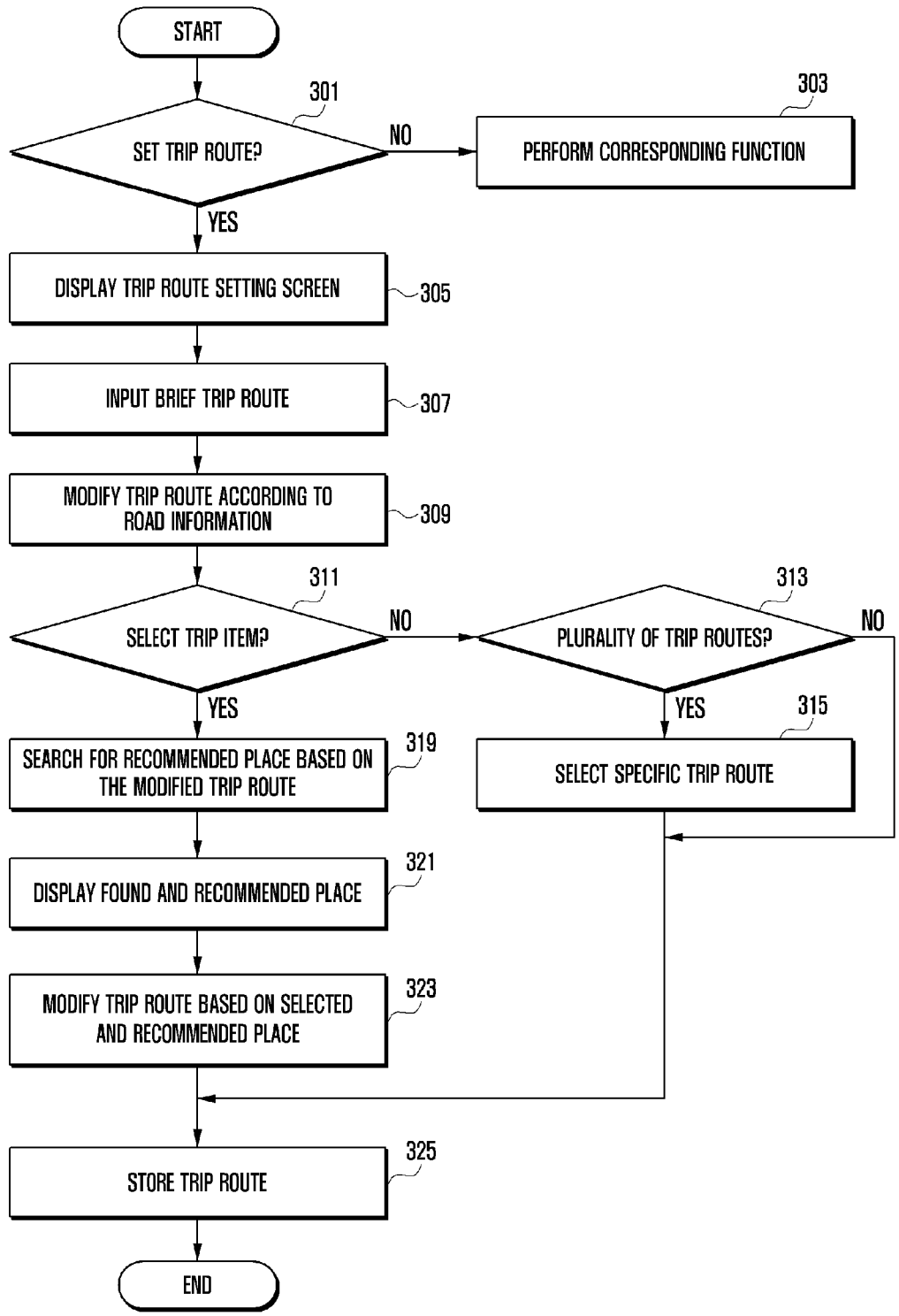
FIG. 3 is a flow chart illustrating a method for setting a trip route in an electronic apparatus according to an embodiment of the present disclosure.

FIG. 3 is a flow chart illustrating a method for setting a trip route in an electronic apparatus according to an embodiment of the present disclosure. FIGS. 4A to 4F are screen examples illustrating methods for setting a trip route in an electronic apparatus according to various embodiments of the present disclosure.

Referring to FIGS. 3 and 4A to 4F, a flow chart and various screen examples are illustrated, in which a control unit 110 according to an embodiment of the present disclosure identifies whether setting a trip route is requested at operation 301. If the setting of the trip route is not requested, then the control unit 110 performs a corresponding function by branching off to operation 303. For example, the control unit 110 may display a predetermined trip route view screen, perform a music play function, or maintain a waiting state according a user setting.

Figure 4A:
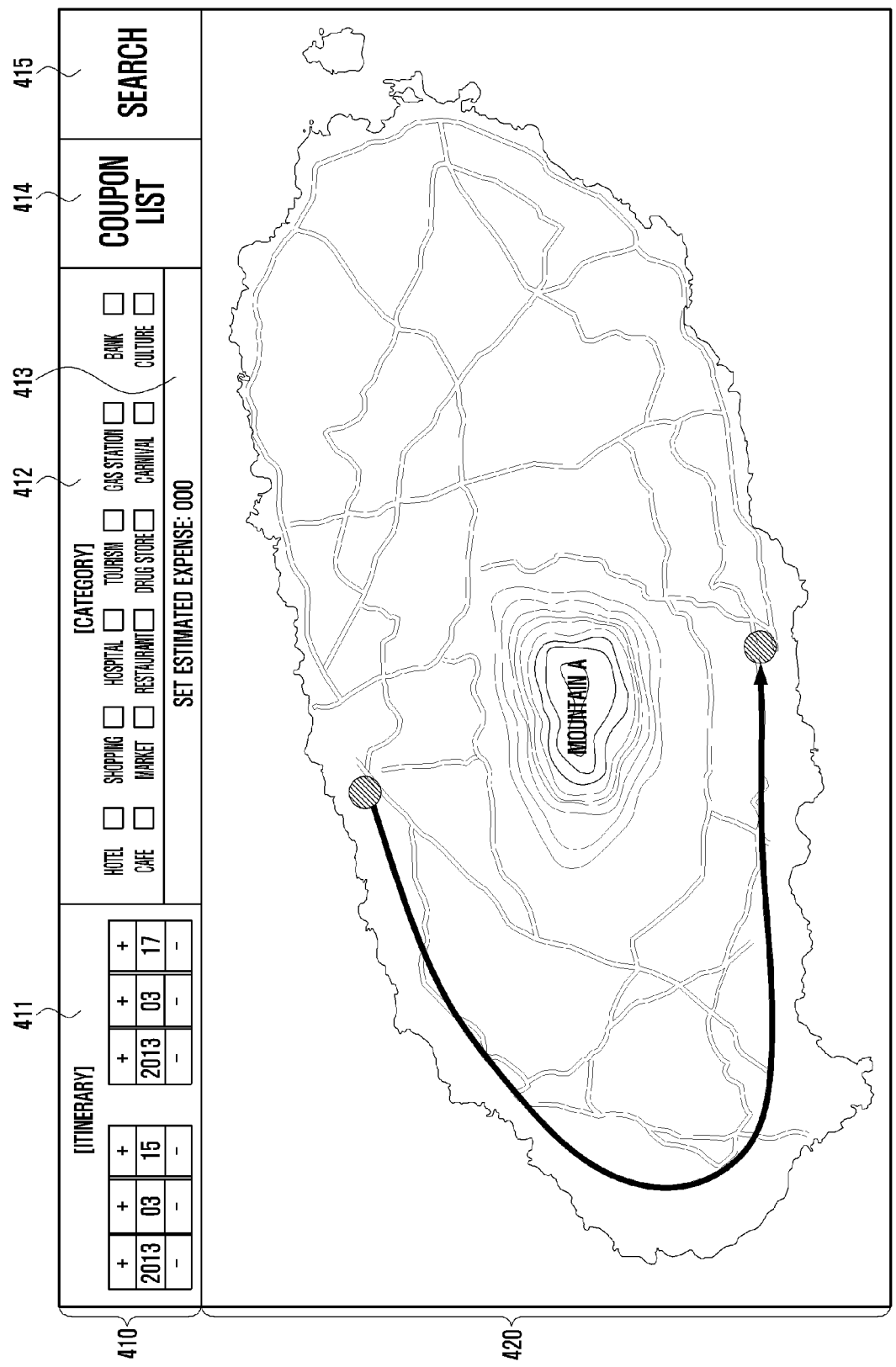

Alternatively, if the setting of the trip route is requested, then the control unit 110 displays a trip route setting screen at operation 305. For example, the control unit 110 can display a trip route setting screen as shown in FIG. 4A. The route setting screen may include a menu area 410 having a plurality of menus for controlling a trip route setting and a map area 420 for displaying a map of destination. The menu area 410 may include an itinerary menu 411, a category menu 412, an estimated expense setting menu 413, a coupon view menu (e.g., a coupon list) 414, and a search menu 415.

The control unit 110 receives an input of a brief trip route at operation 307. For example, the control unit 110 identify a user's touch movement received from a map as a brief trip route as shown in FIG. 4A.

If the input of the brief trip route is completed, then the control unit 110 modifies the trip route based on road information at operation 309. For example, the control unit 110 can generate a trip route by modifying the touch movement based on the road information. Here, more than one trip route can be generated. For example, the control unit 110 can display 2 trip routes as shown in FIG. 4B.

The control unit 110 identifies whether a trip item is selected at operation 311. The trip item may be category information required to search for recommendation information in the vicinity of the trip route. For example, the trip item may include a lodging, a tourist resort, a restaurant, a carnival, cafe, and a historic site.

If a trip item is not selected at operation 311, then the control unit 110 identifies whether a plurality of trip routes exist by branching off to operation 313. If the plurality of trip routes do not exist at operation 313, then the control unit 110 stores the trip route by proceeding to operation 325. If the plurality of trip routes do exist at operation 313, then the control unit 110 identifies a selection of a specific trip route at operation 315, and stores the selected trip route at operation 325.

If a trip item is selected at operation 311, then the control unit 110 searches for recommendation information based on the modified trip route and selected trip items by proceeding to operation 319. For example, the control unit 110 can request the information providing server 300 for the recommendation information by transmitting the modified trip route and selected trip items.

Figure 4C:
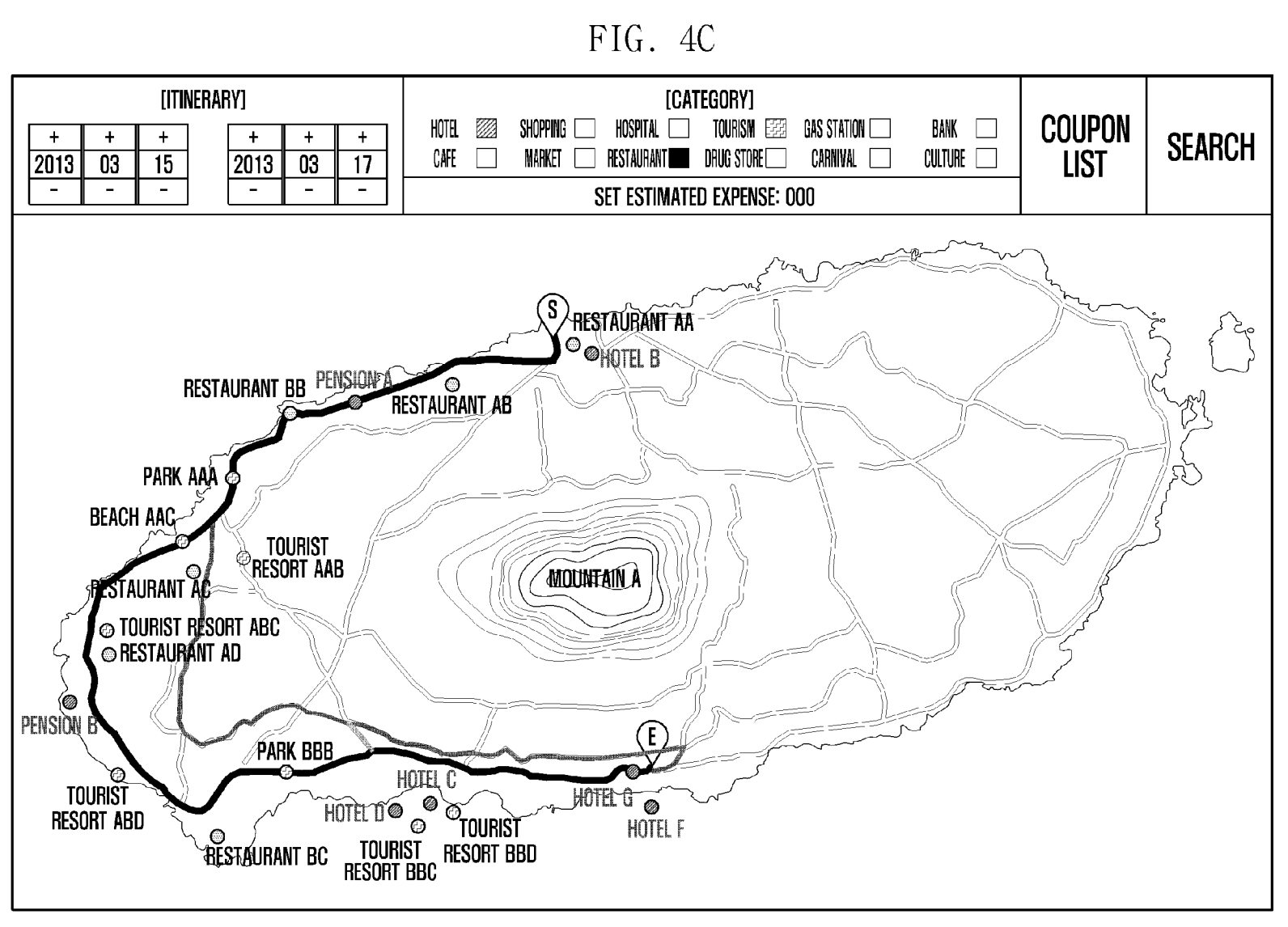

The control unit 110 displays the found recommendation information on a map at operation 321. For example, if trip items of lodging (e.g., hotel), restaurant, and tourist resort are selected as shown in FIG. 4C, then the control unit 110 receives recommendation information (place) from the information providing server 300 and displays it on the map. Here, the recommendation information can be displayed in a different visual form according to the type of trip item. For example, the lodging can be displayed in a first color, the restaurant can be displayed in a second color, and the tourist resort can be displayed in a third color. However, the embodiment of the present disclosure is not limited to distinguish the type of recommendation information in colors, and may utilize various methods.

If an electronic pen 200 approaches a specific recommendation place (for example, Park AAA) as shown in FIG. 4D, then the control unit 110 can display a popup window 430 in order to show detailed information (e.g., name, pictures, internet address, etc.) of the specific recommendation place. Like this, a user can select a desired place after checking the detailed information of recommendation places. If a selection of recommendation place is detected, then the control unit 110 can modify the trip route as shown in FIG. 4E.

Figure 4E:
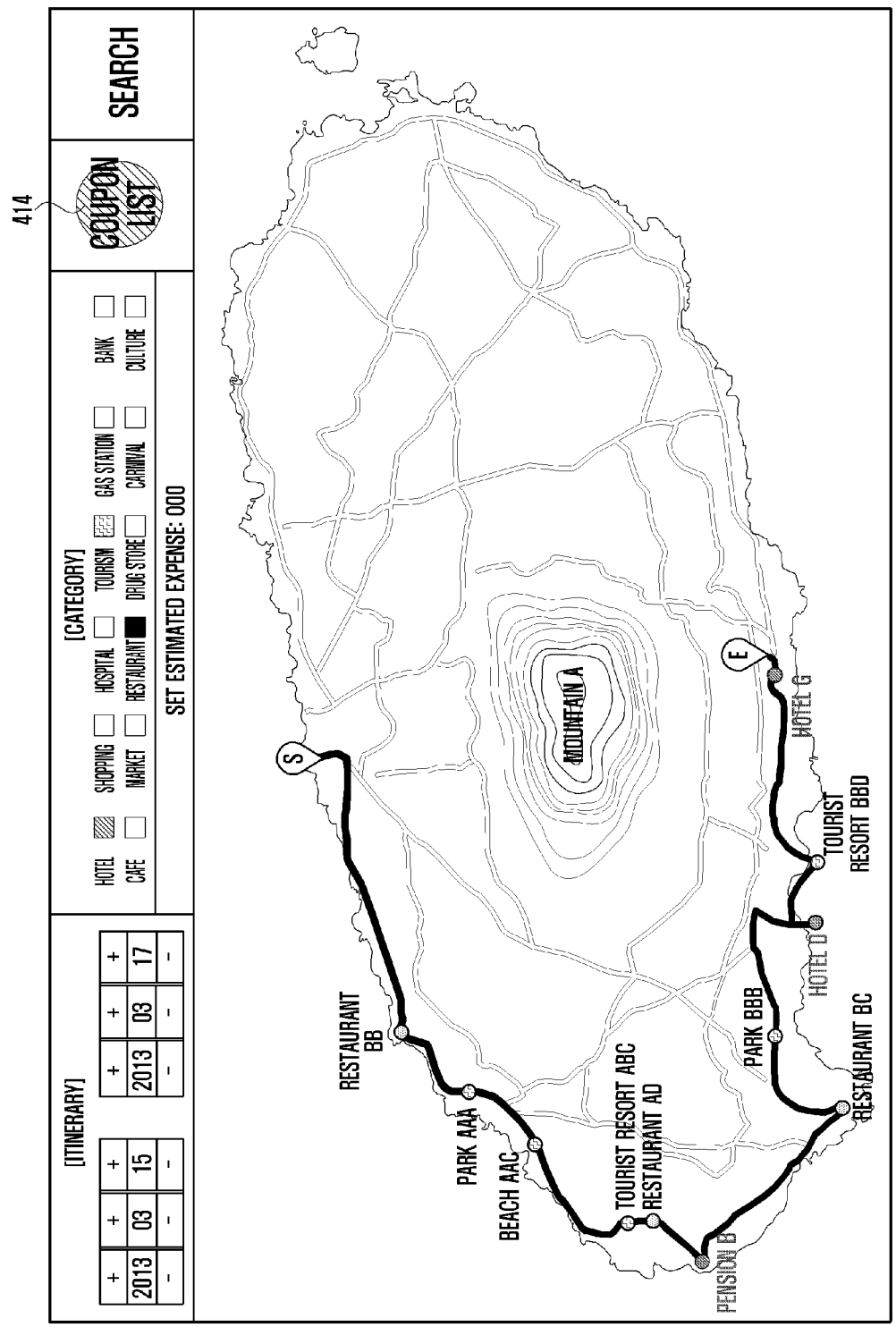
Figure 4F:
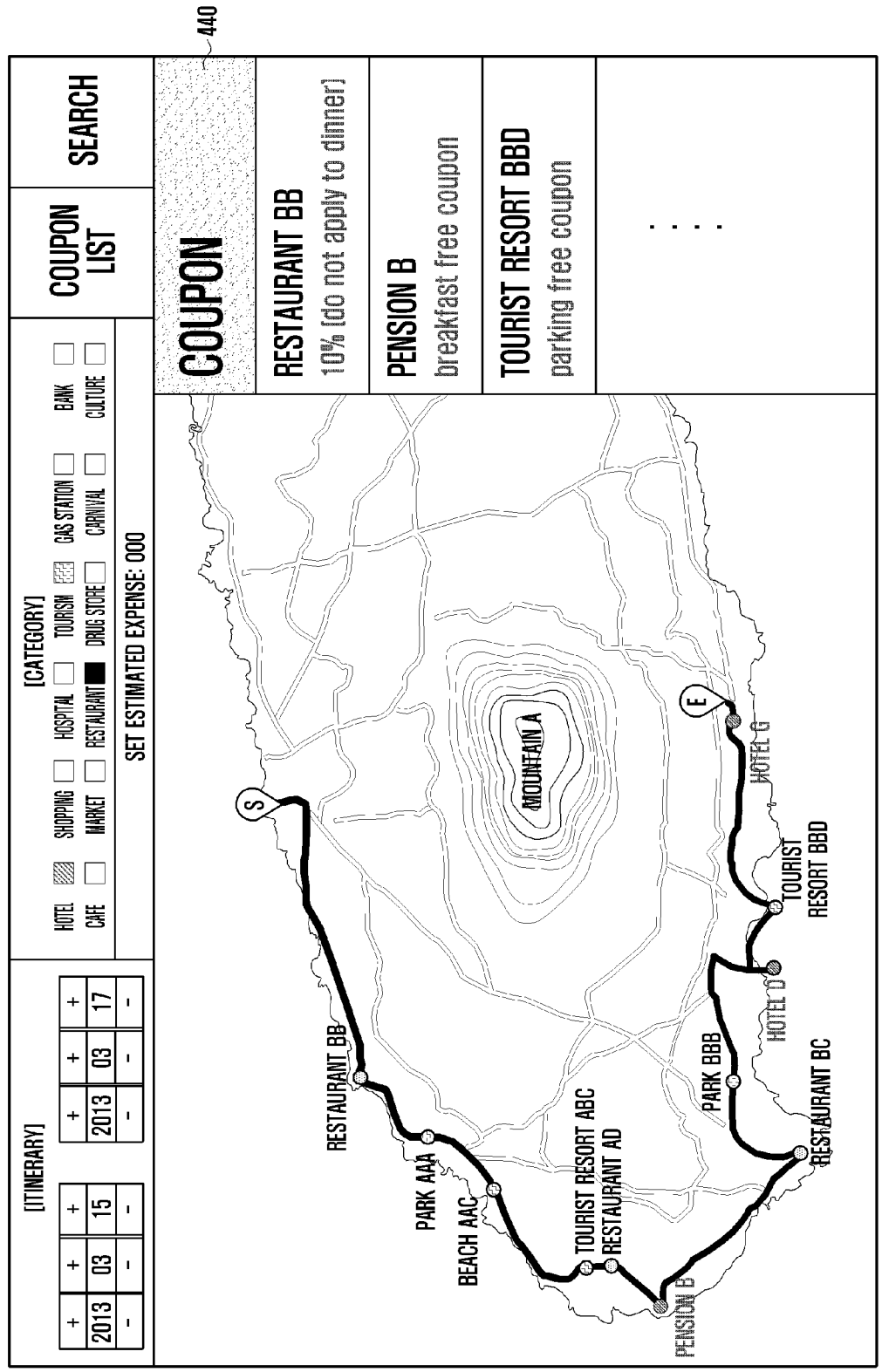

If a coupon view menu 414 is selected as shown in FIGS. 4E and 4F, then the control unit 110 can output a coupon list 440 (e.g. restaurant BB, with a 10% discount, pension B, with a breakfast free coupon, tourist resort BBD, with a free parking coupon, etc.) for the recommendation information (place) displayed on the map. Here, the user can select or change the recommendation places referring to the coupon list 440. FIG. 4E shows a coupon list of the selected recommendation information. However, if the coupon view menu 414 is selected prior to selecting desired recommendation information from the found recommendation information, then the control unit 110 may output a coupon list for the found recommendation information.

The control unit 110 modifies the trip route based on the selected recommendation information (for example, lodging, restaurant, and tourist resort) at operation 323, and then stores the trip route at operation 325.

Alternatively, the operation 311 can be performed before the operation 307. Namely, another embodiment of the present disclosure can select trip items first then input a brief trip route later. Further, the order of operation 311 and operation 313 can be changed. For example, the user can select the final route from a plurality of routes then select trip items.

In the meantime, an example of setting a trip route for the whole itinerary at one time has been described above. However, another embodiment of the present disclosure can set the trip route in a day unit. For example, in a case of a 2 night and a 3 day itinerary, an embodiment of the present disclosure can set the trip route sequentially for the first, second, and third days of the itinerary.

Figure 5:
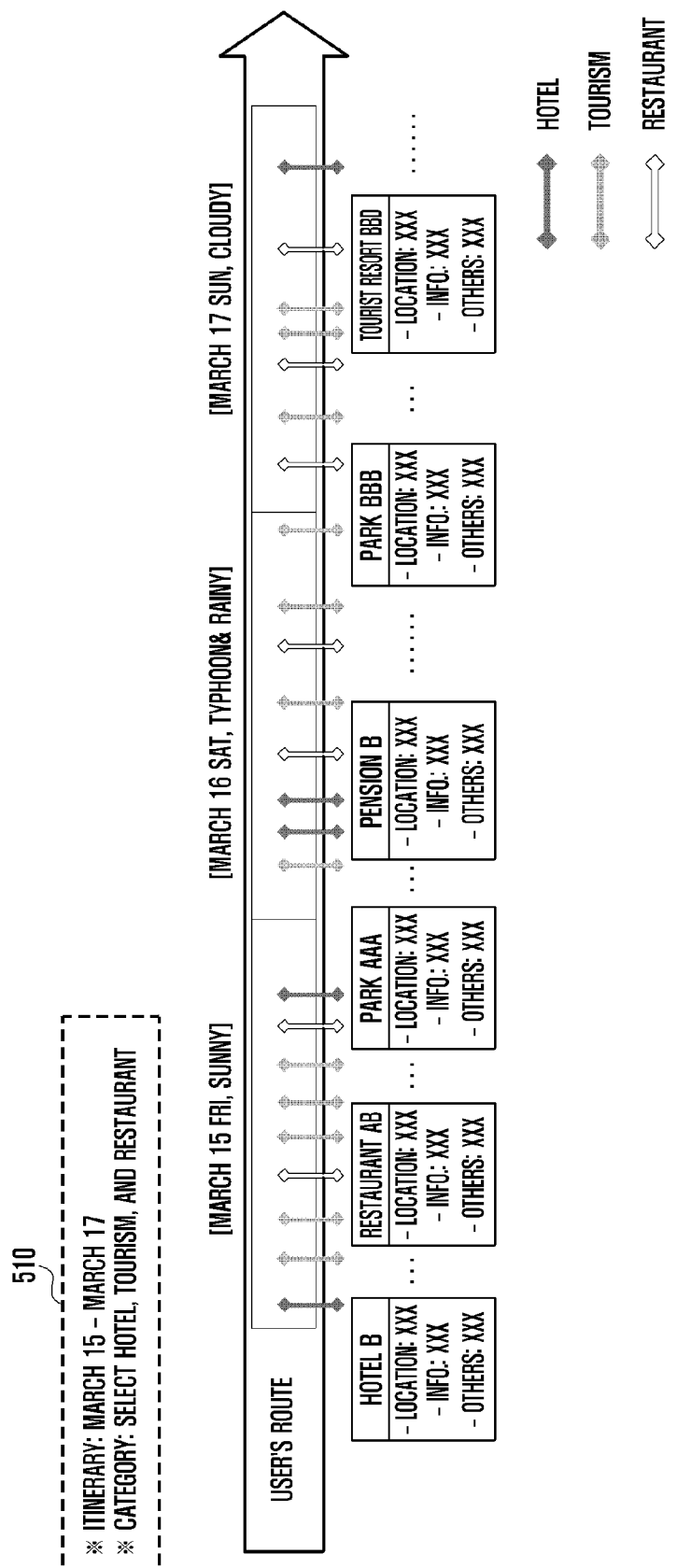
FIG. 5 is a graph illustrating an itinerary according to an embodiment of the present disclosure.

FIG. 5 is a graph illustrating an itinerary according to an embodiment of the present disclosure.

Referring to FIG. 5, an electronic apparatus 100 according to an embodiment of the present disclosure is illustrated, where the electronic apparatus 110 can display a trip route (e.g., user's route) in a graph form and organized, for example, according to date, time and location. The graph may be a chronicle having a horizontal arrow mark. The graph may include an itinerary and selectable optional information 510 at the upper left side. The graph can sequentially display recommendation information (place) selected by a user from the left to the right along the trip route, and brief information of the recommendation place can be displayed under the arrow mark. Here, the user can identify detailed information by selecting the brief information. The electronic apparatus 100 can visually distinguish recommendation places according to the types of recommendation places.

The electronic apparatus 100 can classify the itinerary in a day unit (hereafter, daily itinerary). For example, the electronic apparatus 100 can classify the daily itinerary based on the place of lodging.

Alternatively, the electronic apparatus 100 can classify the daily itinerary by dividing the total trip distance equally or unequally if no lodging information exists. For example, if the total trip distance is 300 km and the itinerary is 2 nights and 3 days, the electronic apparatus 100 can classify the daily itinerary in 100 km unit.

Further, the electronic apparatus 100 can classify the daily itinerary by considering the start time and the end time of the trip. If the first daily itinerary starts in the afternoon and the last daily itinerary ends in the morning, then the trip distances of the first and the last daily itinerary may be set relatively shorter. For example, if the total trip distance is 300 Km and the itinerary is 2 nights and 3 days, then the electronic apparatus 100 can classify the daily itinerary by allocating 70 Km to the first day, 180 Km for the second day, and 50 Km for the third day.

Further, the electronic apparatus 100 can classify the daily itinerary by considering at least one of weather information and traffic information. For example, if a bad weather or traffic jam is expected, the electronic apparatus 100 can set the trip distance of corresponding daily itinerary relatively shorter.

Lastly, the electronic apparatus 100 can classify the daily itinerary according to a user input.

Figure 6:
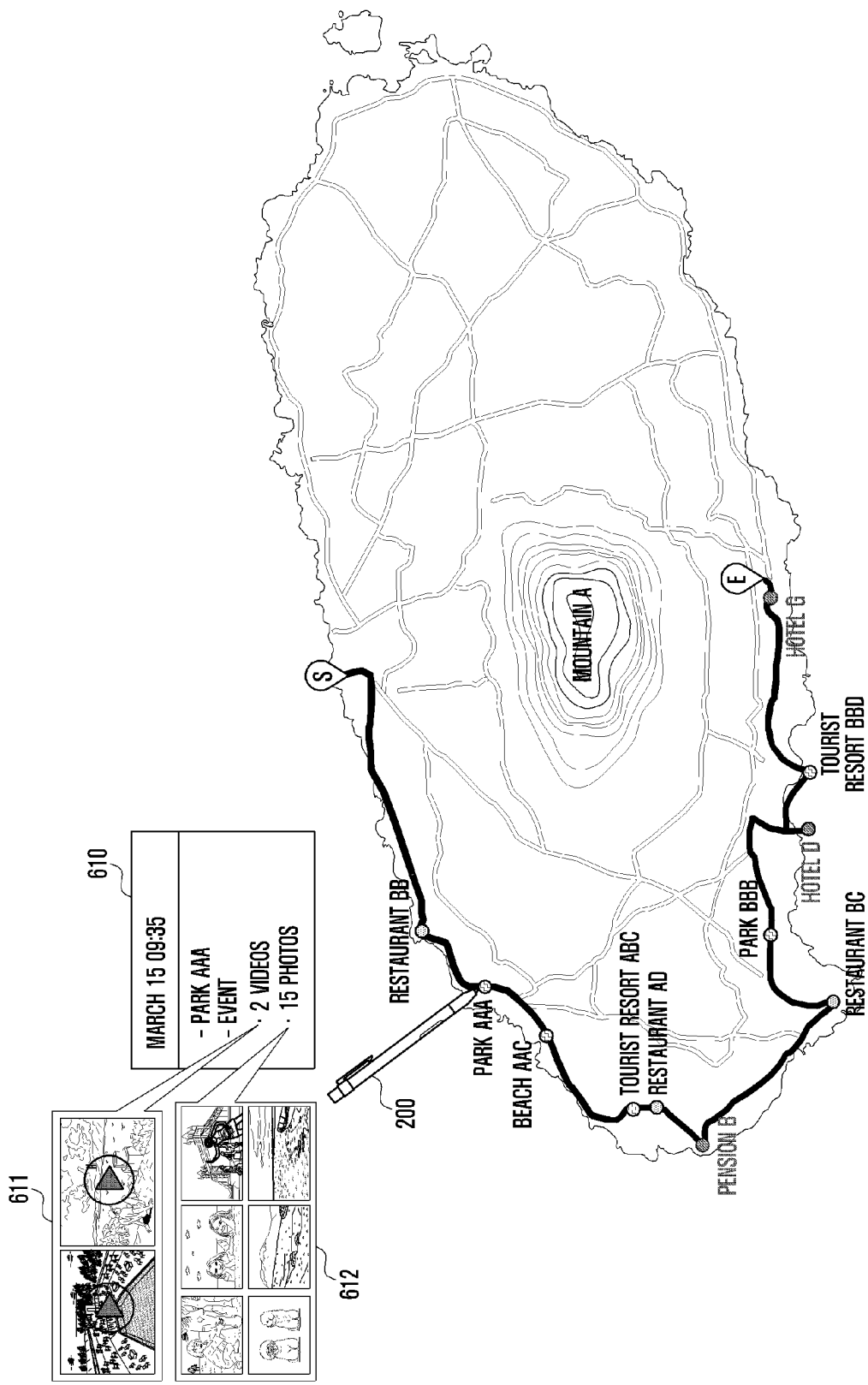
FIG. 6 is a screen example illustrating a trip route set according to an embodiment of the present disclosure.

FIG. 6 is a screen example illustrating a trip route set according to an embodiment of the present disclosure.

Referring to FIG. 6, a map output by an electronic apparatus 100 is illustrated, where the map includes the final trip route in a trip route view screen if a predetermined trip route view function is performed. If a specific location is selected from the trip route view screen or an approach of electronic pen is detected, then the electronic apparatus 100 checks whether an event linked to the corresponding location exists, and displays information 610 of the linked event if information exists. Here, the electronic apparatus 100 can display thumbnail images (for example, videos 611 and photos 612) of contents included in the event. FIG. 6 shows that the user recorded 2 videos and 15 photos in Park AAA at 09:35 on March 15 Friday. Here, the time may be the first or last generation time of the contents. For this, the electronic apparatus 100 can store location and time information when generating the contents such as a photo, a video, a memo, and a diary. The location information can be obtained by the location information receiver 170.

Figure 7:
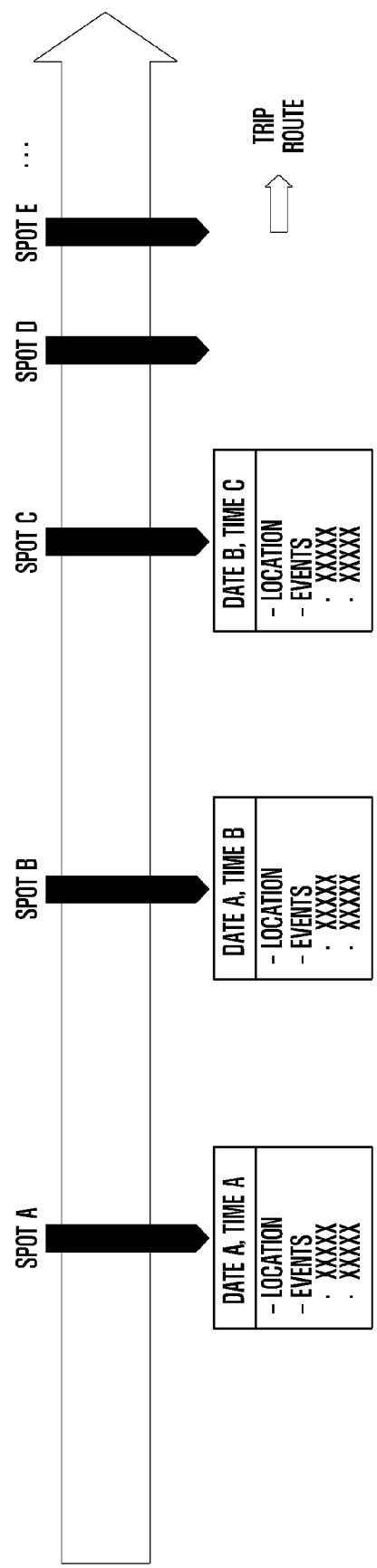
FIG. 7 is a screen example illustrating a trip route set according to an embodiment of the present disclosure.

FIG. 7 is a screen example illustrating a trip route set according to an embodiment of the present disclosure.

Referring to FIG. 7, a chronicle form of the trip route view screen is illustrated. If the chronicle form is displayed, then the electronic apparatus 100 searches for recommendation places linked to an event in the trip route and outputs the found recommendation places in a chronicle form. By this, the user can intuitively identify the contents generated in the travel, and can easily prepare travel notes (diary). For example, as illustrated in FIG. 7, the various locations (e.g., spots A through E) visited by the traveler are illustrated, described and chronicled according to date and time.

As described above, the method and system for managing an itinerary according to the various embodiments of the present disclosure enables an easy setting of a trip route by inputting a brief route in a map, and provides recommendation information for a trip item selected by a user based on the set trip route. Therefore, the various embodiments of the present disclosure can provide a user-oriented travel guide.

Further, the various embodiments of the present disclosure enables an easy preparation of travel notes (diary) by linking contents generated in a travel to a trip route.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a Compact Disk (CD), DVD, magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for providing a trip route on an electronic device, the method comprising:
   generating, by the electronic device, the trip route for a trip;
   selecting a trip item for recommendation information searching;
   searching for recommendation information of the selected trip item based on the generated trip route;
   displaying on a display of the electronic device the searched recommendation information at a corresponding location on the generated trip route;
   modifying the generated trip route based on selected recommendation information from the displayed searched recommendation information; and
   storing the modified trip route,
   wherein the searched recommendation information is displayed on the display in a different visual form according to a type of trip item,
   wherein the trip route is displayed on the display as a chronicle form having a horizontal arrow mark, and
   wherein, if the chronicle form is displayed on the display, the method further comprises:
      searching for recommendation places linked to an event in the trip route based on location information of the trip route, the location information being determined by using coordinates determined using one of a global positioning system and a triangulation calculation, and
      outputting the searched recommendation places on the chronicle form displayed on the display so that a user of the electronic device may identify contents generated during the trip and prepare travel notes.

2. The method of claim 1, wherein the generating of the trip route further comprises:
   receiving a touch movement for setting the trip route on a map; and
   generating the trip route by modifying the received touch movement with road information.

3. The method of claim 1, further comprising:
   outputting a route setting screen for setting the trip route, wherein the route setting screen comprises:
      a menu area including a plurality of menus for controlling the trip route setting; and
      a map area for displaying a map of a destination.

4. The method of claim 1, wherein the searching for the recommendation information further comprises:
   transmitting information of the generated trip route and the selected trip item to a predetermined information providing server; and
   receiving a search result from the predetermined information providing server.

5. The method of claim 1, further comprising:
   outputting detailed information of specific recommendation information, when the specific recommendation information is selected from the displayed recommendation information or an approach of an electronic pen is detected at a location of the specific recommendation information.

6. The method of claim 1, further comprising:
   outputting a coupon list for the searched recommendation information or the selected recommendation information.

7. The method of claim 1, further comprising:
   identifying update information periodically for the selected recommendation information.

8. The method of claim 1, further comprising:
   identifying weather and road information in real time, and re-recommending the trip route based on the identified weather and road information.

9. The method of claim 1, further comprising:
   identifying the location information when generating contents; and
   storing the generated contents by linking the generated contents to the trip route.

10. The method of claim 9, further comprising:
    outputting a thumbnail image of the linked contents, when an approach of an electronic pen is detected on the trip route linked to the generated contents.

11. An electronic apparatus comprising:
    an input receiver configured to receive a signal of selecting a trip item for recommendation information searching;
    a processor configured to:
       generate a trip route for a trip,
       search for recommendation information of the selected trip item based on the generated trip route,
       display on a display of the electronic apparatus the searched recommendation information at a corresponding location on the generated trip route, and
       modify the generated trip route based on selected recommendation information from the displayed searched recommendation information; and
    a memory configured to store the modified trip route, wherein the searched recommendation information is displayed on the display in a different visual form according to a type of trip item,
wherein the trip route is displayed on the display as a chronicle form having a horizontal arrow mark, and
wherein, if the chronicle form is displayed on the display, the processor is further configured to:
  search for recommendation places linked to an event in the trip route based on location information of the trip route, the location information being determined by using coordinates determined using one of a global positioning system and a triangulation calculation, and
  output the searched recommendation places on the chronicle form displayed on the display so that a user of the electronic device may identify contents generated during the trip and prepare travel notes.

12. The electronic apparatus of claim 11, further comprising:
a touch detector configured to detect a touch movement for setting the trip route on a map,
wherein the processor is further configured to generate the trip route by modifying the received touch movement with road information.

13. The electronic apparatus of claim 11, further comprising:
a display configured to output a route setting screen including a menu area including a plurality of menus for controlling the trip route setting and a map area for displaying a map of a destination.

14. The electronic apparatus of claim 11, further comprising a transceiver configured to:
transmit information of the generated trip route and the selected trip item to a predetermined information providing server, and
receive a search result from the predetermined information providing server.

15. The electronic apparatus of claim 11, wherein the processor is further configured to output detailed information of specific recommendation information, when the specific recommendation information is selected from the displayed recommendation information or an approach of an electronic pen is detected at a location of the specific recommendation information.

16. The electronic apparatus of claim 11, wherein the processor is further configured to output a coupon list for the searched recommendation information or the selected recommendation information.

17. The electronic apparatus of claim 11, wherein the processor is further configured to:
identify update information periodically for the selected recommendation information, and
inform the update information when the update information exists.

18. The electronic apparatus of claim 11, wherein the processor is further configured to:
identify weather and road information in real time, and
identify and inform whether a modification of the trip route is necessary based on the identified weather and road information.

19. The electronic apparatus of claim 11, wherein the processor is further configured to:
identify the location information when generating contents,
store the generated contents by linking the generated contents to the trip route, and
output a thumbnail image of the linked contents when an approach of an electronic pen is detected on the trip route linked to the generated contents.

20. A system for providing a trip route, the system comprising:
an electronic apparatus configured to:
  generate the trip route for a trip,
  display on a display recommendation information related to the generated trip route and a trip item when the trip item is selected, and
  modify the generated trip route based on selected recommendation information from the displayed recommendation information; and
an information providing server configured to:
  receive the trip route and the trip item from the electronic apparatus,
  search for the recommendation information related to the trip item based on the trip route transmitted from the electronic apparatus, and
  transmit the searched recommendation information to the electronic apparatus,
wherein the searched recommendation information is displayed on the display in a different visual form according to a type of trip item,
wherein the trip route is displayed on the display as a chronicle form having a horizontal arrow mark, and
wherein, if the chronicle form is displayed on the display, the electronic apparatus is further configured to:
  search for recommendation places linked to an event in the trip route based on location information of the trip route, the location information being determined by using coordinates determined using one of a global positioning system and a triangulation calculation, and
  output the searched recommendation places on the chronicle form displayed on the display so that a user of the electronic device may identify contents generated during the trip and prepare travel notes.

* * * * *